US012254781B1

(12) United States Patent
Riffle

(10) Patent No.: US 12,254,781 B1
(45) Date of Patent: Mar. 18, 2025

(54) EDUCATIONAL MULTIPLAYER CARD GAME SYSTEM AND METHOD

(71) Applicant: Michael Wayne Riffle, Granite Bay, CA (US)

(72) Inventor: Michael Wayne Riffle, Granite Bay, CA (US)

(*) Notice: Subject to any disclaimer, the term of this patent is extended or adjusted under 35 U.S.C. 154(b) by 471 days.

(21) Appl. No.: 17/576,818

(22) Filed: Jan. 14, 2022

(51) Int. Cl.
| | | |
|---|---|---|
| *G09B 19/00* | (2006.01) |
| *G09B 1/32* | (2006.01) |
| *G09B 5/02* | (2006.01) |
| *G09B 19/08* | (2006.01) |

(52) U.S. Cl.
CPC ............... *G09B 19/00* (2013.01); *G09B 1/32* (2013.01); *G09B 5/02* (2013.01); *G09B 19/08* (2013.01)

(58) Field of Classification Search
CPC . G09B 19/00; G09B 1/32; G09B 5/02; G09B 19/08
See application file for complete search history.

(56) References Cited

U.S. PATENT DOCUMENTS

| | | |
|---|---|---|
| 5,078,403 A | 1/1992 | Chernowski, Jr. |
| 5,297,801 A * | 3/1994 | Croker ................. A63F 3/0423 434/167 |
| 5,497,999 A | 3/1996 | Stewart et al. |
| 5,617,432 A | 4/1997 | Eggenberger et al. |
| 5,863,043 A | 1/1999 | Bitner |
| 5,882,258 A | 3/1999 | Kelly et al. |
| 5,957,774 A | 9/1999 | Holmes, Jr. et al. |
| 6,179,294 B1 | 1/2001 | Turnali |
| 6,341,779 B1 | 1/2002 | Merritt |
| 6,536,769 B1 | 3/2003 | Palacios et al. |
| 6,561,514 B2 | 5/2003 | Myles |
| 6,588,756 B1 | 7/2003 | Hughes |
| 6,651,984 B1 | 11/2003 | Luken |
| 6,676,414 B1 | 1/2004 | MacHendrie et al. |
| 6,863,275 B2 | 3/2005 | Chiu et al. |
| 6,910,893 B2 | 6/2005 | Dillhoff |
| 7,017,908 B1 | 3/2006 | Tan et al. |
| 7,416,186 B2 | 8/2008 | Walker et al. |
| 8,523,573 B1 | 9/2013 | Villarreal-Reyes |
| 2003/0027112 A1* | 2/2003 | Warneke .................. G09B 7/02 434/167 |
| 2006/0055111 A1* | 3/2006 | DeWeese .................. A63F 1/00 273/292 |
| 2007/0248939 A1 | 10/2007 | Miller |
| 2008/0042356 A1* | 2/2008 | Ahmad ..................... A63F 1/00 273/299 |
| 2008/0073847 A1* | 3/2008 | Hixon ....................... A63F 1/04 273/299 |
| 2008/0252014 A1* | 10/2008 | Hathorn ................ A63F 3/0423 273/299 |

(Continued)

*Primary Examiner* — Omkar A Deodhar
*Assistant Examiner* — Shauna-Kay Hall
(74) *Attorney, Agent, or Firm* — Michael A. Kerr; Kerr IP Group, LLC

(57) ABSTRACT

An educational multiplayer card game, system, and method of play that combines strategy and randomization is provided. More particularly, the present disclosure relates to an educational card game including cards having synonym and antonym attributes, wherein cards can be chained together according to a synonym attribute and cards can perform contrast strikes according to an antonym attribute. Further, the educational card game can include more than one language on each card.

20 Claims, 9 Drawing Sheets

(56) References Cited

U.S. PATENT DOCUMENTS

| | | |
|---|---|---|
| 2009/0061397 A1 | 3/2009 | Treloar |
| 2011/0012305 A1* | 1/2011 | Charlot ................ A63F 3/0423 273/272 |
| 2012/0068408 A1* | 3/2012 | Ruderer ................ A63F 3/0423 273/272 |
| 2013/0119608 A1 | 5/2013 | Volkin |

* cited by examiner

EDUCATIONAL MULTIPLAYER CARD GAME SYSTEM AND METHOD

FIELD

The present disclosure relates to an educational multiplayer card game system and method of play that combines strategy and chance. More particularly, the present disclosure relates to an educational card game including cards having synonym and antonym attributes, wherein cards can be chained together according to a synonym attribute and cards can perform contrast strikes according to an antonym attribute.

BACKGROUND

A variety of types of card games have existed for hundreds of years. Initially, the card decks used to play card games were comprised of common face cards. There is also a longstanding tradition of trading cards and associated trading card games. Trading cards began as a method of disseminating information on public figures, such as athletes and musicians. However, trading cards were adapted for both collection and game play to drive interest in the trading card decks. For instance, Magic: The Gathering and Pokémon leveraged the unique attributes of individual trading cards in combination with competitive game play to drive interest in both the game itself and the collection of various cards produced for those games. Further, there exist various educational card games that typically utilize specialized card decks. These education card games frequently educate players simply through information contained on the cards in the deck, but do not involve any special methods of play that utilize the unique educational attributes of the cards comprising the deck.

Many games that utilize common face cards are simply games of chance. These games have rules that require the random selection of cards, or the games involve the occurrence of events beyond the players' control. Some other games utilizing common face cards require some strategy, but the amount of strategy is handicapped through limiting game play rules.

In contrast, trading card games frequently invoke strategic thought and game play. However, both Magic: The Gathering and Pokémon included cards of varying power that skewed gameplay and reduced strategic thought. This was especially so when players obtained rare and powerful trading cards that dominated almost all other cards existing in the various games.

Of the wide variety of educational card games and strategic card games in existence, there are few examples of card games that are educational, interesting, and have an evenly balanced card deck that rewards strategic and tactical play instead of aggressive trading for powerful cards, or pure chance.

Thus, a strategic card game that includes an evenly balanced deck of educational cards is desirable. Further, an educational card game that includes educational information integrated into gameplay and game strategy is also desirable.

SUMMARY

An educational card game system and method of play are described. In an illustrative embodiment, the educational card game method involves two or more players and begins by initiating a game session. The method continues by obtaining a group of cards, wherein each card includes at least one attribute. The method proceeds by providing each player with an initial hand containing a predetermined number of cards, wherein the cards are randomly selected from the group of cards. The method continues when the first player enters into play at least one card from the first player's hand. The first player then chains together the at least one attribute of at least two cards played by the first player. The first player continues the method by discarding at least one card from the first player's hand and receiving at least one card distributed from the group of cards. The method terminates the game session when a triggering event occurs.

In another illustrative embodiment, the educational card game is embodied as a non-transitory computer-readable medium storing instructions that, if executed by a computing system having a processor, cause the computing system to initiate a game session involving two or more players comprising a plurality of game events. The game events include obtaining a group of cards, providing each player with an initial hand of a predetermined number of cards, receiving at least one card from a first player's hand, distributing at least one card from the group of cards to the first player, entering into play at least one card from at least one player's hand, and terminating the game session when a triggering event occurs. Each card of the group of cards includes at least one attribute. The initial hand of cards for each player are randomly selected from the group of cards.

In a further illustrative embodiment, the educational card game is a system involving two or more players. The educational card game system includes at least two players, a deck of educational cards, a game session, and an initial hand of a predetermined number of cards for each player. Each card of the deck of educational cards has at least one attribute. The hand of cards for each player is randomly selected from the deck of cards. The game session includes a plurality of game events including a game event wherein a first player chains at least two cards from the first player's hand together in play, and a triggering event terminating the game session.

FIGURES

The present invention will be more fully understood by reference to the following drawings which are presented for illustrative, not limiting, purposes.

FIG. 1 shows the exemplary character card Juggernaut.
FIG. 2 shows the exemplary action card Inimical.
FIG. 3 shows the exemplary resource card Zealous.
FIG. 4 shows the exemplary wealth card Aromatic.
FIG. 5 shows an exemplary method of game play as disclosed herein and in accordance with various embodiments.
FIG. 6 shows an exemplary method of game play as disclosed herein and in accordance with various embodiments.
FIG. 7 shows the game play area and game setup as disclosed herein and in accordance with various embodiments.
FIG. 8 shows an exemplary resource chain commanded by the character card Maelstrom as disclosed herein and in accordance with various embodiments.
FIG. 9 shows the character card Savant commanding dissimilar resource cards and the creation of a resource chain as disclosed herein and in accordance with various embodiments.

DESCRIPTION

Figure 1:

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

In various embodiments, the education multiplayer card game method and system disclosed herein may be embodied as a card game entitled "Scholar and Sage," which includes four categories of cards: character cards, action cards, resource cards, and wealth cards. A player can chain cards together that have matching synonym or similar attributes. The chaining aspect enforces learning and to gain a greater probability to win requires a player to understand synonyms and similar high impact words. The chaining aspect also creates the ability to introduce and incorporate a high number of words into a game setting. The use of different card types, such as Wealth, Character, Resource, and Action card types, with different attributes allows a player to create scarcity and advantage, forcing players to make tactical and strategic decisions that affect their ability to win.

Language skills, vocabulary, and word associations are key components of standardized tests, certifications, qualifying exams, etc. As such, entire industries have arisen to improve these skills both because of their professional benefit and individuals' difficulty in acquiring these skills without assistance. However, information retention is maximized when the user is interested, engaged, and motivated to use the educational materials. Interest, engagement, and motivation to continue are the hallmarks of a game. Thus, the educational card game described herein is an effective educational tool because it is comprehensive and fun. As players play the educational card game described herein, they read, hear, and associate words together as either synonyms or antonyms. While playing the educational card game, players are repeatedly exposed to vocabulary words and definitions, to synonym and antonym associations, and to one or more languages in certain embodiments. The contrast strike rule, discussed below, allows a player to conduct a strategy of drawing contrasting and antonyms word cards to play against an opponent's cards. This feature was incorporated to create a novel mechanism and incentive for players to learn new words and word associations. Therefore, as the players play the educational card game, they have fun, expand their vocabulary, and create associations among the words within their expanded vocabulary.

With reference now to FIG. 1, there is shown an exemplary character card 100. The character card main word or name 102 is 'Juggernaut' with a phonetic pronunciation 104 listed below the name. In various embodiments, the character name can include 'Swindler', 'Charlatan', 'Epicure', 'Savant', 'Fanatic', 'Maelstrom', 'Apothecary', or any other vocabulary word suitable for a selected education level. Synonym words 106 are listed vertically along an edge of the card 100, while antonym or contrast words 108 are listed horizontally along a bottom edge of the card 100. The synonym words 106 listed can include one or more character names 102 of other character cards. The synonym words 106 listed can further include synonym words that are not a character name of any other card in the deck. Further still, the synonym words 106 listed can include every character name in the deck that is a synonym of the character card 100 character name 102. The antonym words 108 can include one or more character names 102 of other character cards. The antonym words 108 listed can further include antonym words that are not a character name of any other card in the deck. Further still, the antonym words 106 listed can include every character name in the deck that is an antonym of the character card 100 character name 102. A definition 110 of the character name 102, which can also include synonyms to the character name 102, is provided below a character picture 112. In one embodiment, the character picture 112 is the same for all character cards 100, regardless of the character name 102. In another embodiment, the character picture 112 is unique to each character name 112, and can therefore aid players in remembering a character name 112 meaning and synonym and antonym associations. A special ability or action trait 114 is listed for in-game use and player instruction. In the exemplary embodiment, the special ability 114 allows the Juggernaut character card 100 to perform a combined attack with two other character cards during a player's attack phase, which combined attack counts as an action for each character card used in the combined attack. In various embodiments, a character card 100 can include any one of the following special abilities 114: spend one (1) resource during owner's defense phase (opponent player's action phase) in exchange for increasing a character card's defense value by one (1) point, which lasts for one turn; and expend one (1) resource during owner's defense phase to negate a damage point to owner from any attack. In this particular embodiment, the special ability does not count as an action. In other embodiments, a character card 100 can include other special abilities not provided herein.

The character card 100 further includes a label indicating the wealth 118 required to activate the character card 100 and resources 116 required to supply the character card 100. In the illustrative embodiment, a character card can require between one (1) and four (4) resources. In other embodiments, certain character cards can require no resources or more than four (4) resources, up to a value that is reasonable based on the number of cards intended to be used, number of players, etc. The attack value 120 and defense value 122 of the character card 100 are listed in the top left corner. The attack value 120 and defense value 122 can be a positive integer or zero (0). In a further embodiment, the attack value 120 and defense value 122 are denoted by a simple binary system, either no value or a value of one (1). The attack value 120 and defense value 122 can further be denoted by any similar system of symbols relating values. In one embodiment, a defense value 122 of zero (0) is denoted by a horizontal dash and positive integer values are denoted by an associated numeral.

Figure 2:
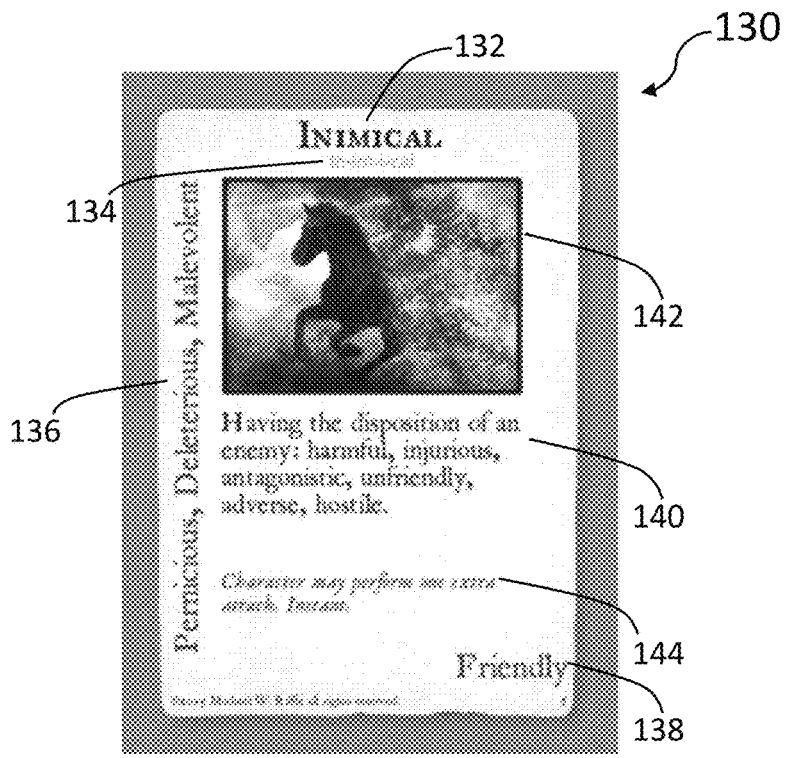

Referring to FIG. 2, an exemplary action card 130 is shown. The action card main word or name 132 is 'Inimical' with a phonetic pronunciation 134 listed below the name. In various embodiments, the action card name 132 can include 'Inequity', 'Penury', 'Pernicious', 'Deleterious', and 'Malevolent', or any other vocabulary word suitable for a selected education level. Synonym words 136 are listed vertically along an edge of the action card 130, while antonym or contrast words 138 are listed horizontally along a bottom edge of the action card 130. The synonym words 136 listed can include one or more action card names 132 of other action cards 130. The synonym words 136 listed can further include synonym words that are not an action card name 132 of any other card in the deck. Further still, the synonym words 136 listed can include every action card name 132 in the deck that is a synonym of the action card name 132. The antonym words 138 can include one or more action card names 132 of other action cards 130. The antonym words 136 listed can further include antonym words that are not an action card name 132 of any other card in the deck. Further still, the antonym words 136 listed can include every action card name 132 in the deck that is an antonym of the action card name 132.

A definition 140 of the action card name 132 is provided below a picture 142. In one embodiment the action picture 142 associated with the action card 130 is the same regardless of the action name 132. In a further embodiment, the picture 142 is unique to each action card name 132. A special ability or action trait 144 is listed for in-game use and player instruction. All action cards have a special ability 144 and are used to change or modify other cards, player actions, and game features. The special ability includes an action time, an action duration, an action target, an effect, and a cost to use the special ability 144. Unless otherwise stated on the action card 130, an action card 130 can only be played during that player's action phase, an action card's 130 effect will only last for the action phase during which it was played, and an action card 130 must be targeted at a character card 100. Where an action card 130 lists the action time "instant", that action card's 130 action 144 occurs immediately and the action card's 130 duration is limited to the performance of the action 144, for example, an attack or a defense against an opponent's attack. Where an action card 130 lists the action time "temporary", that action card's 130 action occurs during a specific time period, for example, during the player's action phase, during an opponent player's action phase, during the player's turn, or during an opponent player's turn, or other specified duration of game time. Where an action card 130 lists the action time "lasting", that action card's 130 action remains in effect upon the targeted character card 100 until the end of the game, until countered by another special action, until the completion of a specified term, or until a specified payment is met.

In the exemplary embodiment, the special ability 144 allows the character card upon which the action card 130 is played to perform one (1) extra attack, immediately. In various embodiments, an action card 130 can include any one of the following special abilities 144: discard one (1) resource or resource card from any single character card 100 in play; or eliminate half (½) the wealth or wealth cards currently in an opponent's treasury. For accounting purposes, round up when determining the wealth to eliminate. In one embodiment, this occurs instantly. In other embodiments, an action card 130 can include other special abilities not provided herewith.

Figure 3:
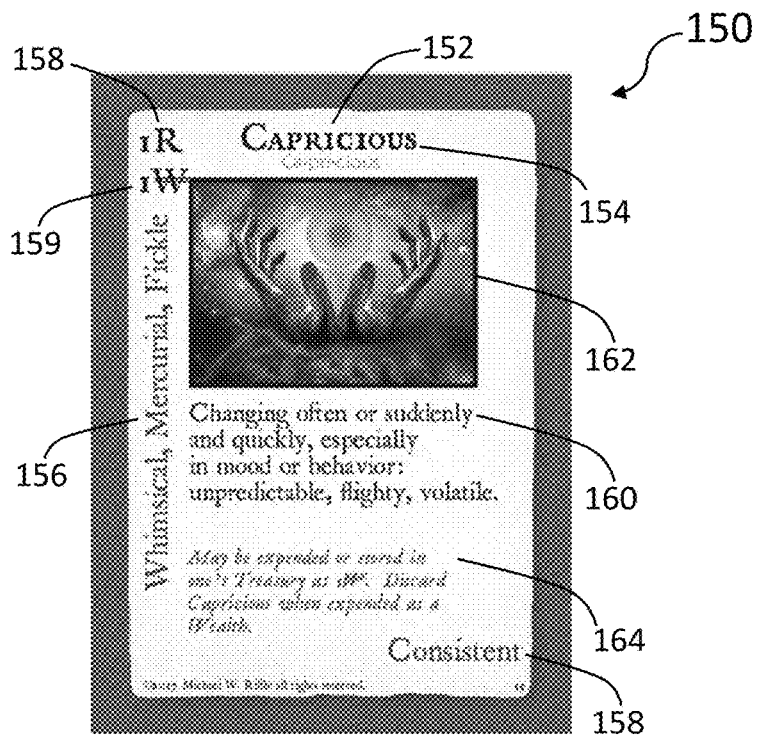

Referring to FIG. 3, an exemplary resource card 150 is shown. The resource card main word or name 152 is 'Capricious' with a phonetic pronunciation 154 listed below the resource card name 152. In various embodiments, the resource card name 152 can include 'Zealous', 'Fanatical', 'Fervent', 'Ardent', 'Loquacious', 'Garrulous', 'Voluble', 'Anecdote', 'Narrative', 'Myth', 'Legend', 'Insouciant', 'Indifferent', 'Blithe', 'Nonchalant', 'Laconic', 'Pithy', 'Terse', 'Taciturn', 'Reticent', 'Diffident', 'Laconic', 'Banal', 'Insipid', 'Hackneyed', '*Trite*', 'Virulent', 'Vitriolic', 'Pernicious', 'Infectious', 'Revere', 'Lionize', 'Laud', 'Extol', 'Applaud', 'Contrite', 'Remorseful', 'Repentant', 'Innocuous', 'Benign', 'Genial', 'Benevolent', 'Temperate', 'Servile', 'Obsequious', 'Scrupulous', 'Sycophantic', 'Deferential', 'Servile', 'Subservient', 'Hilarity', 'Mirth', 'Glee', 'Merriment', 'Exuberance', 'Whimsical', 'Mercurial', and 'Fickle', or any other vocabulary word suitable for a selected education level. Synonym words 156 are listed vertically along an edge of the resource card 150, while antonym or contrast words 158 are listed horizontally along a bottom edge of the resource card 150. The synonym words 156 listed can include one or more resource card names 152 of other resource cards 150. The synonym words 156 listed can further include synonym words that are not a resource card name 152 of any other card in the deck. Further still, the synonym words 156 listed can include every resource card name 152 in the deck that is a synonym of the resource card name 152. The antonym words 158 can include one or more resource card names 152 of other resource cards 150. The antonym words 156 listed can further include antonym words that are not a resource card name 152 of any other card in the deck. Further still, the antonym words 156 listed can include every resource card name 152 in the deck that is an antonym of the resource card name 152.

A definition 160 of the resource card name 152 is provided below a picture 162 associated with the resource card 150. In one embodiment, the resource picture 162 is the same for all resource cards 160, regardless of the resource name 152. In a further embodiment, the picture 162 is unique to each resource card name 152. In some embodiments, a special ability or action trait 164 is listed for in-game use and player instruction. When a resource card 150 includes a special ability 164, that special ability can only be used while the resource card 150 is in the player's hand. Once a resource card's 150 special ability 164 is used, the resource card 150 is no longer available to supply a character card 100 as a resource, for placement in a resource area, or for use in a contrast strike as described below. Additionally, once a resource card's 150 special ability 164 is used, the resource card 150 is no longer playable as a resource card 150 for the remainder of the game session; and the resource card 150 takes the characteristic trait of the special ability 164. Resource cards 150 further include a resource value 158. In one embodiment, the resource value 158 can be any positive integer. In another embodiment, the resource value 158 can be any positive value. The illustrative resource card 150 has a resource value 158 of one (1) and further includes a wealth value 159 associated with the special ability 144. In one embodiment, the wealth value 159 can be any positive integer. In another embodiment, the wealth value 159 can be any positive value. In some embodiments, a resource card 150 does not include a wealth value 159. Principally, resources are used to supply character cards 100 and allow the character card 100 to be used in game-play.

In the exemplary embodiment, the special ability 164 provides that the resource card 150 may be expended or stored in a player's treasury as one (1) wealth and is discarded when expended as wealth. In a further embodiment, a resource card 150 can include the following special ability 164, permanently increase the defense and attack of a character card 100 by one (1) point value, costs one (1) wealth to activate. In other embodiments, a resource card 150 can include other special abilities not provided herein.

Figure 4:
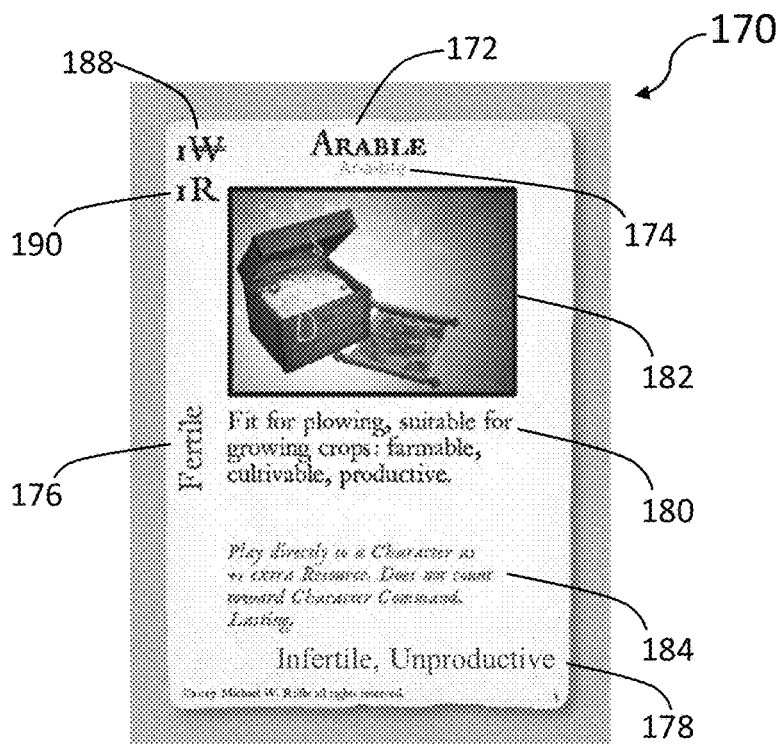

Referring now to FIG. 4, an exemplary wealth card 170 associated with the illustrative "Scholar & Sage" gaming card deck is shown. The wealth card main word or name 172 is 'Arable' with a phonetic pronunciation 174 listed below the wealth card name 172. In various embodiments, the wealth card name 172 can include 'Fertile', 'Aromatic', 'Fragrant', 'Perfumed', 'Scented', 'Galleon', 'Trireme', 'Munificent', 'Magnanimous', 'Generous', 'Avarice', 'Opus', 'Composition', 'Overture', 'Paucity', 'Scarcity', and 'Dearth', or any other vocabulary word suitable for a selected education level. Synonym words 176 are listed vertically along an edge of the wealth card 170, while antonym or contrast words 178 are listed horizontally along a bottom edge of the wealth card 170. The synonym words 176 listed can include one or more wealth card names 172 of other wealth cards 170. The synonym words 176 listed can further include synonym words that are not a wealth card name 172 of any other card in the deck. Further still, the synonym words 176 listed can include every wealth card name 172 in the deck that is a synonym of the wealth card name 172. The antonym words 178 can include one or more wealth cards name 172 of other wealth cards 170. The antonym words 176 listed can further include antonym words that are not a wealth card name 172 of any other card in the deck. Further still, the antonym words 176 listed can include every wealth card name 172 in the deck that is an antonym of the wealth card name 172. A definition 180 of the wealth card name 172 is provided below a picture 182 associated with the wealth card 170. In one embodiment, the wealth card picture 182 is the same for all wealth cards 170, regardless of the wealth card name 160. In a further embodiment, the picture 182 is unique to each wealth card name 172. A wealth value 188 of one (1) is indicated on the wealth card 170. In one embodiment, the wealth value 188 can be any positive integer. In another embodiment, the wealth value 188 can be any positive value. The illustrative wealth card 170 further includes a resource value 190 of one (1) associated with the special ability 184. In one embodiment, the resource value 190 can be any positive integer. In another embodiment, the resource value 190 can be any positive value.

In some embodiments, a special ability or action trait 184 is listed for in-game use and player instruction. When a wealth card 170 includes a special ability 184, that special ability can only be used while the wealth card 170 is in the player's hand. Once a wealth card's 170 special ability 184 is used, the wealth card 170 is no longer available for use as wealth or for storage in the player's treasury. Additionally, once a wealth card's 170 special ability 184 is used, the wealth card 170 is no longer playable as a wealth card 170 for the remainder of the game session. Or, if the playing deck runs out of cards to draw from, players can reshuffle the discard pile and used card pile to begin a new deck to draw from. Any card reshuffled regains the option to play a special ability.

In the exemplary embodiment, the special ability 184 provides that the wealth card 170 can be permanently played directly to supply a character card 100 with one (1) resource, but does not count toward a character command. In a further embodiment, a wealth card 170 can include the following special ability 184, play as an action card requiring all opponents to discard any of a certain card from their hands.

The orientation of the synonym words, antonym words, card names, picture, and all the various elements included on the exemplary cards shown in FIGS. 1-4 are not intended to be limiting and can be organized, oriented, positioned, and framed in any appropriate orientation. Similarly, specific card names, synonym words, and antonym words described with regard to FIGS. 1-4 are not intended to be limiting in any way and can include any words appropriate for a desired education level.

Wealth cards 170 can be considered a form of in-game currency that is spent during the action phase, unless the wealth card 170 states that a player must expend a wealth during a game phase other than the action phase. Thus, the action or special ability 184 can trump the general rule. In game play, wealth cards 170 are discarded or spent, unless the wealth card 170 is played in another manner pursuant to a special ability 184. In contrast, resource cards 150 remain or stay in the game after use (except when a special ability 164 provides otherwise) in order to sustain a character card 100 with resource supply value or points. Players spend wealth to allow a character card 100 to enter game play. Players also spend wealth to use certain special abilities.

In one embodiment, only cards of the same type can have card names that are synonyms or antonyms of one another. In a further embodiment, cards of different types can have cards names that are synonyms or antonyms of one another.

Figure 5:
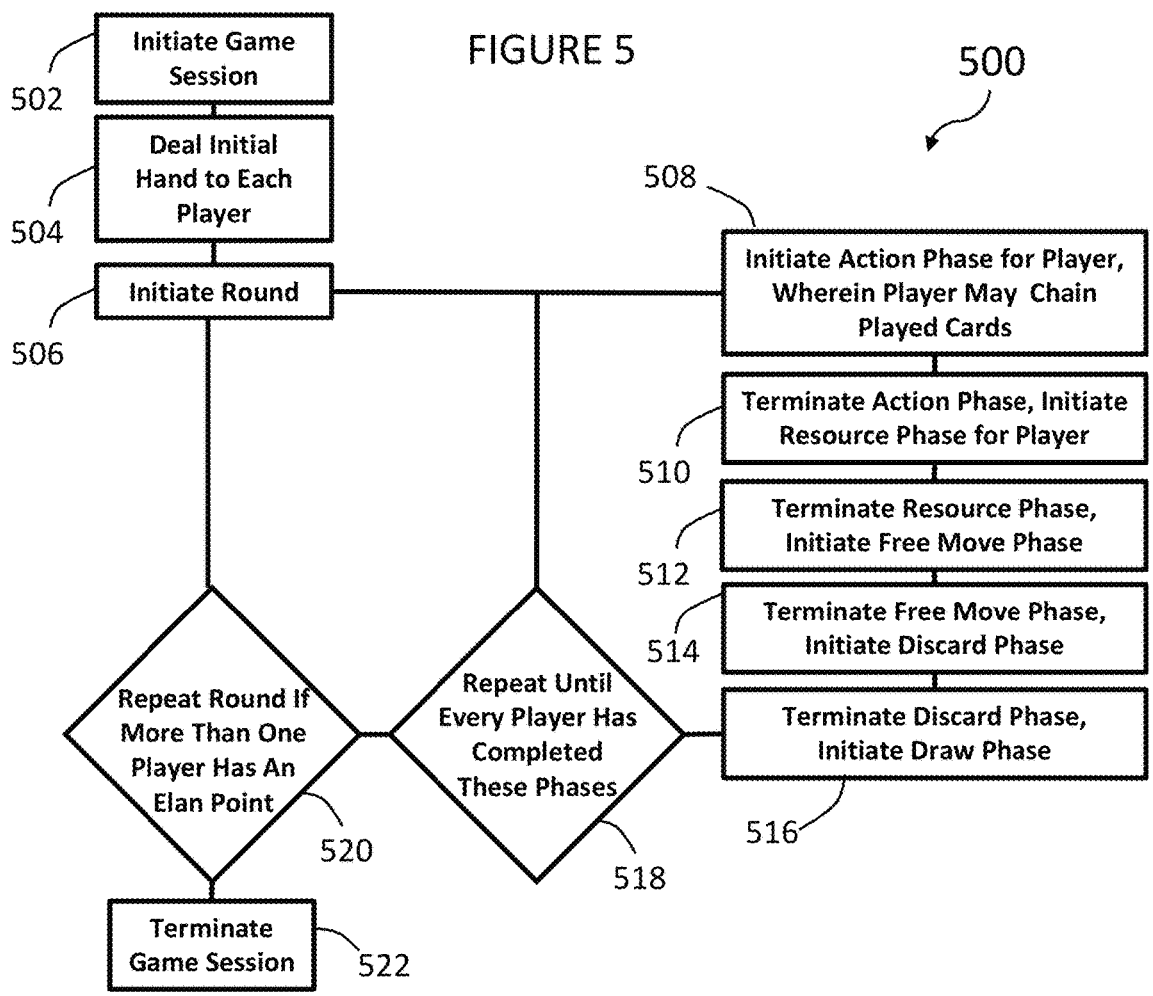

Referring now to FIG. 5, a flow chart 500 of an illustrative method of game play is shown. In the illustrative game play method, a game session is initiated 502 and each player is dealt a hand of cards prior to initiating a first round of game play at step 504. In one embodiment, the initial hand dealt to each player consists of three (3) cards. In a further embodiment, the initial hand dealt to each player consists of five (5) cards. In a still further embodiment, each player starts the game with ten (10) Elan points, and each damage point subtracts one (1) Elan point. The last player with at least one (1) Elan point wins.

Each round begins 506 with an action phase 508 for a first player. During the action phase 508, the first player can put one or more cards into play by removing the one or more cards from that player's hand. The first player can chain together that player's cards in-play that have synonymous card names, and the first player can perform a contrast strike against an opponent player's card(s) that are already in-play when the first player's card name is an antonym of the other player's card that is in-play. The first player can terminate their action phase when they have no more plays or when they desire, and initiate the resource phase 510. Next the first player can terminate their resource phase by initiating their free move phase 512. Next the first player can terminate their free move phase by discarding selected cards from that player's hand 514. Finally, in one embodiment, the first player can terminate their turn by drawing cards from the deck to add to the first player's hand or to replace the cards used or discarded by that player during the round 516. How to draw new cards is further described below. In one embodiment, the maximum number of cards a player can draw is three (3). In another embodiment, the maximum number of cards a player can draw is one (1). In a further embodiment, the maximum number of cards a player can draw is two (2). In a still further embodiment, the maximum number of cards a player can draw is four (4). In an even further embodiment, the maximum number of cards a player can draw is four (5). Players are allowed a maximum of five (5) cards in their hand. At decision diamond 518 each player proceeds through their own action phase, resource phase, free move phase, discard phase, and draw phase in sequence in the same manner as the first player until every player has played. Once each player has completed their turn, the round ends and a new round begins. This cycle is repeated until only one player has any Elan points remaining 520. When only a single player has remaining Elan points the game ends 522 and the player with any Elan points remaining wins.

In an exemplary embodiment, the educational card game method involves two or more players and begins by initiating a game session. The method continues by obtaining a group of cards, wherein each card includes at least one attribute. The method proceeds by providing each player with an initial hand containing a predetermined number of cards, wherein the cards are randomly selected from the group of cards. The method continues when the first player enters into play at least one card from the first player's hand. The first player then determines which cards to play and how to play each card during the appropriate game phase. The first player can chain together cards using a novel method where one card has at least one similar attribute of at least one other card played by the first player. The first player continues the method by playing cards or lastly discarding unwanted cards from the first player's hand and receiving (drawing) a card distributed from the group of cards up to a predetermined number of cards allowed to be held in the player's hand. The method terminates the game session when a triggering event occurs.

Figure 6:
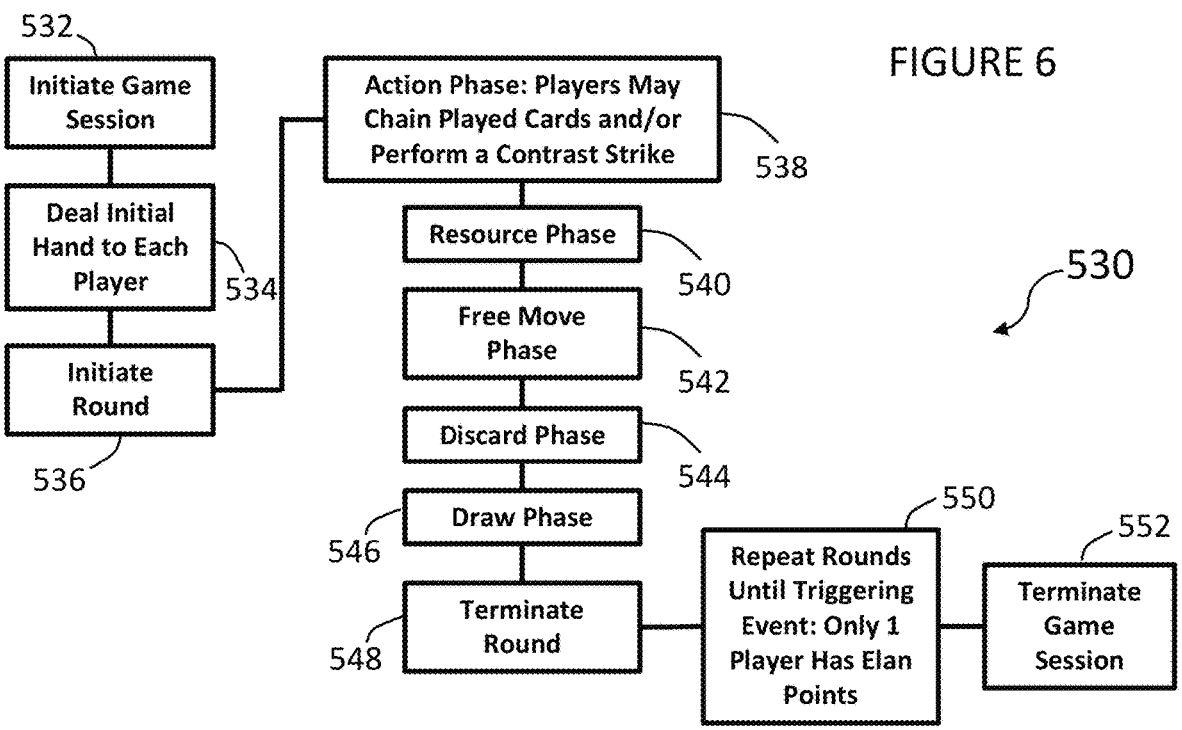

With reference now to FIG. 6, there is shown another illustrative method of gameplay 530. In the illustrative game play method, a game session is initiated 532 and each player is dealt a hand of cards 534. Upon dealing a full hand of cards to each player, the first round begins 536. Each round proceeds through an action phase 538, a resource phase 540, a free move phase 542, a discard phase 544, and a draw phase 546, for each player. During the action phase 538 of a player's turn, that player can chain their played cards together and/or perform a contrast strike against one or more opponent player's cards in-play. The round terminates 548 when the last player has completed each of the five phases of gameplay. Game rounds are repeated until a triggering event occurs 550. In the illustrative embodiment, the triggering event is when only one player has any Elan points remaining. The player with remaining Elan points wins and the game then terminates 552.

Figure 7:
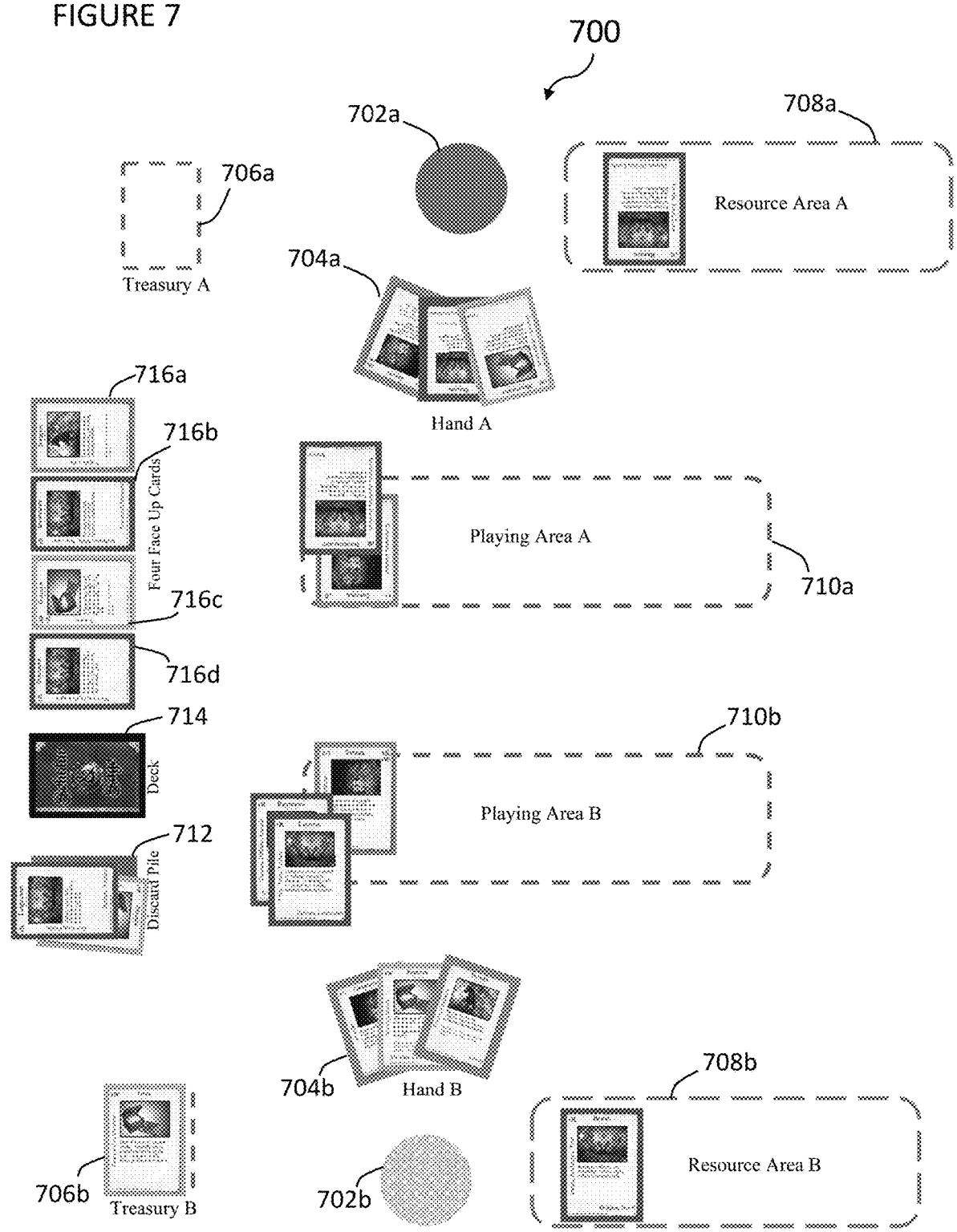

Referring now to FIG. 7, there is shown an illustrative embodiment of a gameplay area 700 and setup. The illustrative embodiment includes opponent players, player A 702a and player B 702b. Each player has a hand 704, a treasury 706, a resource area 708, and a playing area 710. The gameplay setup further includes a discard or used card pile 712, the deck 714, and four face-up cards 716.

In various embodiments, players 702 may review the cards comprising the deck of cards 714 to familiarize the players with qualities and terms of the various cards before initiating gameplay. Additionally, prior to initiating gameplay, the cards should be randomized by shuffling or an electronic equivalent, by a random number generator.

Gameplay begins by dealing a first card face up 716d, and placing the card in a gameplay area 700 so that the card is visible to all players. In the illustrative embodiment, the first card 716d is dealt face up and off to one side of the gameplay area. Next, one card is dealt to each player's hand 704. In the illustrative embodiment the card is dealt to the player 702a on the left side of the game play area first, followed by dealing a card to the player 702b left of that player, and so on. In another embodiment, a card is dealt to each player in a counterclockwise fashion, beginning with the player on the right side of the gameplay area. This process is repeated in order until four cards are face up 716 and off to one side of the gameplay area 700 and each player 702 has three (3) cards in their respective hand 704. This method of dealing the cards further randomizes the deck of cards and limits the inconvenience or difficulty of hand-shuffling a large deck of cards 714. The dealing process and drawing of new cards incorporates an additional method of randomizing the cards and lowers the probability that a player may draw too much of one type of card.

In an illustrative embodiment, each player 702 starts the game with ten Elan points. Each damage point performed against a player subtracts one Elan point from that player. Play begins with the player to the left of the dealer and continues in a clockwise fashion.

During the action phase a player 702 can put character cards 100, action cards 130, resource cards 150 with specified special abilities or resource cards 150 played in a contrast strike, and/or wealth cards 170 into play. Once the required wealth, as indicated on the character card 100, has been spent by the player 702 the character card 100 can be entered into play and placed in the player's playing area 710. A player 702 can spend wealth and bring a character card 100 into play by expending wealth cards 170. However, a character card 100 in-play must be supplied by at least the amount of resources indicated on the character card 100 in order for the character card 100 to attack, defend from an attack, exercise any special ability, or make a free move. Character cards 100 can be supplied by one or more resource cards 150 that the player 702 entered into play from a resource area 708. Additionally, a character card 100 can be supplied by an action card 130 played by the player 702, or by another card played by the player 702 with a special ability that provides for the card's use as supply for a character card 100. In the illustrative embodiment, the character cards 100 and the card(s) supplying the character cards 100 are placed or laid or played in the player's playing area 710. Once entered into play and properly supplied, a character card 100 can attack once during the player's action phase. Further, played character cards 100 can defend once during each opponent player's action phase, also termed the defense phase.

Once a player 702 uses a wealth card 170 as wealth, the wealth card 170 is placed in the 712 discard and used card pile. A player 702 can immediately use a wealth card 170 to purchase or support the special ability of another card entered into play by the player 702. Further, a player 702 can immediately use a wealth card 170 to activate a character card 100 entered into play by the player 702. Further still, a player 702 can immediately use a wealth card 170 for other card-specified reasons. Once a wealth card 170 is used as wealth or saved to the treasury 706, any special ability 184 of the wealth card 170 becomes unavailable for the remainder of the game session. In the event that a wealth card 170 has a special ability 184, the wealth card 170 is treated as an action card 130 when the wealth card's 170 special ability 184 is used by the player 702. A player 702 can play a wealth card 170 directly from the player's hand 704 or save the wealth card 170 to the player's treasury 706 to be spent at a later time.

The treasury 706 and resource area 708 serve a similar purpose by allowing a player 702 to empty their hand 704 and thereby able to draw more cards. Wealth cards 170 can be played, used, or spent during the Action Phase. Wealth cards 170 can be stored to a player's treasury 706 for later in-game use. The purpose for wealth and resources is to create item scarcity that forces players to make tactical and strategic decisions. In so doing, the educational card game facilitates player vocabulary improvement and retention because a player can win tactically if they are quick to inflict damage through contrast strikes and supply character cards 100 through chaining resource cards 150.

During player A's 702a action phase, resource cards can be played against opponent player B's 702b resource cards in the playing area 710b when player A's resource card and the opponent player B's resource card have contrasting meanings or are antonyms of one another. Such an attack is called a contrast strike. When a player plays a resource card to perform a contrast strike, the resource card is then placed in the player's resource area 708 and can immediately be used to supply a character card. The resource card is then available to supply a character card or be placed in the player's resource area 708, even during the same action phase in which the resource card was used to perform a contrast strike. However, the opponent's resource card that suffered the contrast strike is immediately discarded.

Resources commanded by a character card 100 in excess of the amount of resources required to supply that character card 100 are available to absorb damage from an opponent player's attack. This is defined in the "Damage Block" rule, which is discussed in more detail below.

As discussed above, the resource area 708 and the treasury 706 serve the similar purpose of allowing a player to empty their hand 704 and thereby enabling the player to draw more cards. Resource cards 150 can be played or used during the Resource Phase. In one embodiment, resource cards 150 can only be entered into play to supply a character card 100 after first being played to a player's resource area 708 during the resource phase. In a further embodiment, resource cards 150 can be played directly from a player's hand 704 during the action phase. In this embodiment, the resource card 150 can have a special ability 164 or conduct a contrast strike.

In one embodiment, a player may exchange three (3) wealth for one (1) resource. In another embodiment, each character card 100 can command up to two unique resource cards 150, while additional resource cards 150 can be commanded by each character card 100 in a resource chain, discussed in detail below. A resource chain allows a player to commit multiple resource cards 150 to a character card 100, while complying with the character command rule that limits the number of unique resources commanded by a character card 100.

In this embodiment, in order for a player 702 to utilize a played character card's 100 special ability 114, resource card(s) 150 must be expended and discarded, similarly to a damage block. In one embodiment, resource cards 150 expended to supply a character card's 100 special ability 114 must be drawn from resources played in the resource area 708.

During the action phase, a player 702 can chain played cards together with other played cards having synonymous card names. These card chains are termed character chains and resource chains. A player 702 can chain their character cards 100 together when the character cards 100 are in-play, and supplied. When the character card 100 is played directly from the player's hand 704, the only cost is the wealth necessary to activate the character card 100, in this embodiment, no resources are required to chain the currently played character card to a character card already in-play. Any resources attached to the character chain are either attached to the top character card 100 in the resource chain, or the resource card(s) 150 must be placed back in that player's resource area 708. When character cards are chained together, only the top character card's special ability is available for use during that player's action phase. In contrast, any action card(s) 130 attached to a character card 100 remain attached to that character card when character cards are chained together. Thus, in one embodiment action cards 130 can only be detached from a character card 100 through the expenditure of another action card.

During the resource phase, players can play resource cards from their hand to their resource area for later use to supply that player's in-play character card(s). Resource cards must first be played into a player's resource area before that card is available to supply a character card in the player's action phase of a subsequent turn.

During the free move phase, a player can move their resource cards in-play or resource card chains from one of the player's character cards in-play to another of that player's character cards in-play. Additionally, a player can move their resource cards in-play from a position supplying one of their character cards to that player's resource area. However, a player cannot make a free move during this phase with any cards held in the player's hand. Further, action cards attached to a character card in-play can only be moved, removed, or affected by another action card. But action cards move with the character card to which they are attached. And character cards that are not adequately supplied with their required resources cannot be moved during this phase. Otherwise, this means that action cards attached to a character card cannot be moved.

During the discard phase, a player can discard any number of cards or any type of card from the player's hand to the discard or used card pile.

During the draw phase, a player can draw up to and including three cards from either the deck, or from the four face up cards. But a player cannot draw a number of cards that would increase the number of cards in the player's hand beyond a maximum number of cards. In one embodiment, the maximum number of cards each player can have in their hand is five cards. In another embodiment, the maximum number of cards each player can have in their hand is three cards. When a player draws a card from the four face up cards, another card is pulled from the deck to replace the card drawn by the player before the player draws a next card from the deck or from the face up cards. The draw phase concludes a player's turn and causes play to pass to the next player.

Once the deck runs out of cards to draw during play, the discard and used card pile is shuffled and becomes a new deck to draw from. Any card that is shuffled from the discard pile into the deck in such a manner regains the use of its special ability.

A player wins the education card game by being the last player with at least one Elan point.

Figure 8:
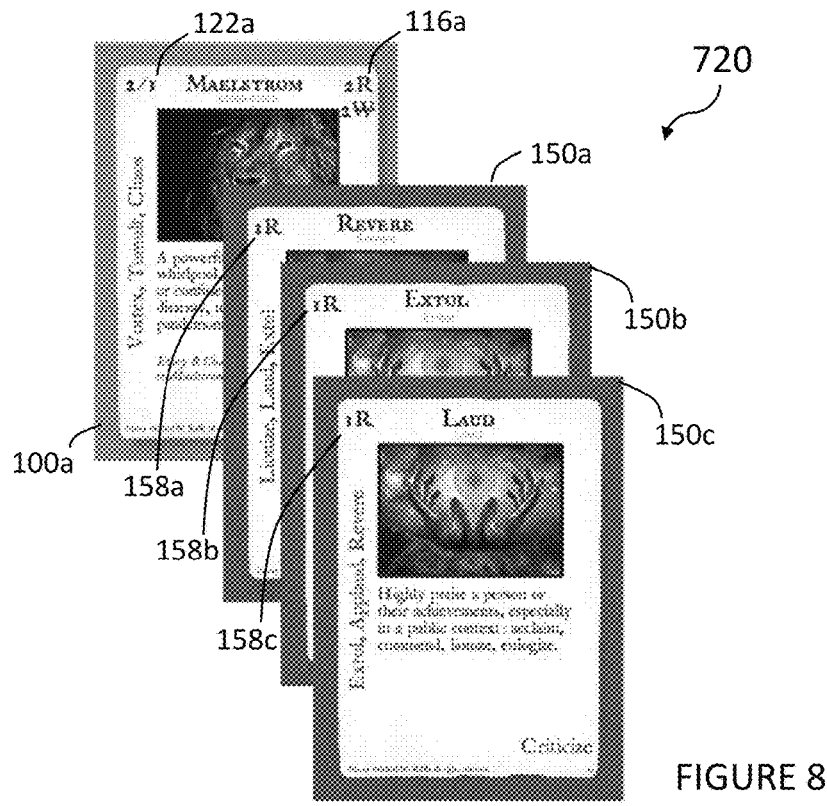

With reference now to FIG. 8, there is shown a chain 720 of resource cards 150a-c supplying the 'Maelstrom' character card 100a. In the illustrative embodiment, the 'Revere' resource card 150a is played during an action phase on the 'Maelstrom' character card 100a. Once the 'Revere' resource card 150a is played on the 'Maelstrom' character card 100a, other resource cards that are synonyms of the 'Revere' resource card 150a can be played to create a resource chain 720 supplying the 'Maelstrom' character card 100a. In the illustrative embodiment, the 'Laud' and 'Extol' resource cards 150b-c can be played from the resource area 708 during the player's action phase and chained to one another to create a three resource chain 720 supplying the 'Maelstrom' character card 100a.

In the illustrative embodiment, the 'Maelstrom' character card 100a has a defense value 122a of one (1), requires a supply of two (2) resources 116a, and commands three (3) resource cards 150a-c, each having a resource value 158a-c of one (1). Since the 'Maelstrom' character card 100a requires only two (2) resources for supply 116a, the third resource included in the resource chain 720 is available to defend against an opponent player's attack by absorbing one (1) damage point of any such attack. This is referred to as a Damage Block. In so absorbing one (1) damage point, the additional resource card 150 can prevent or limit reduction of a player's Elan points. The player then selects the resource card 150 in the resource chain 720 that absorbed the attack, and discard that resource card 150.

The chaining feature can be employed with any cards that are synonyms of one another. Thus, character cards 100 can be chained, but are still subject to the command rule. When character cards 100 are chained, they share resource assets and are limited to two non-synonymous resource cards 150, which can each form a resource chain 720.

Figure 9:
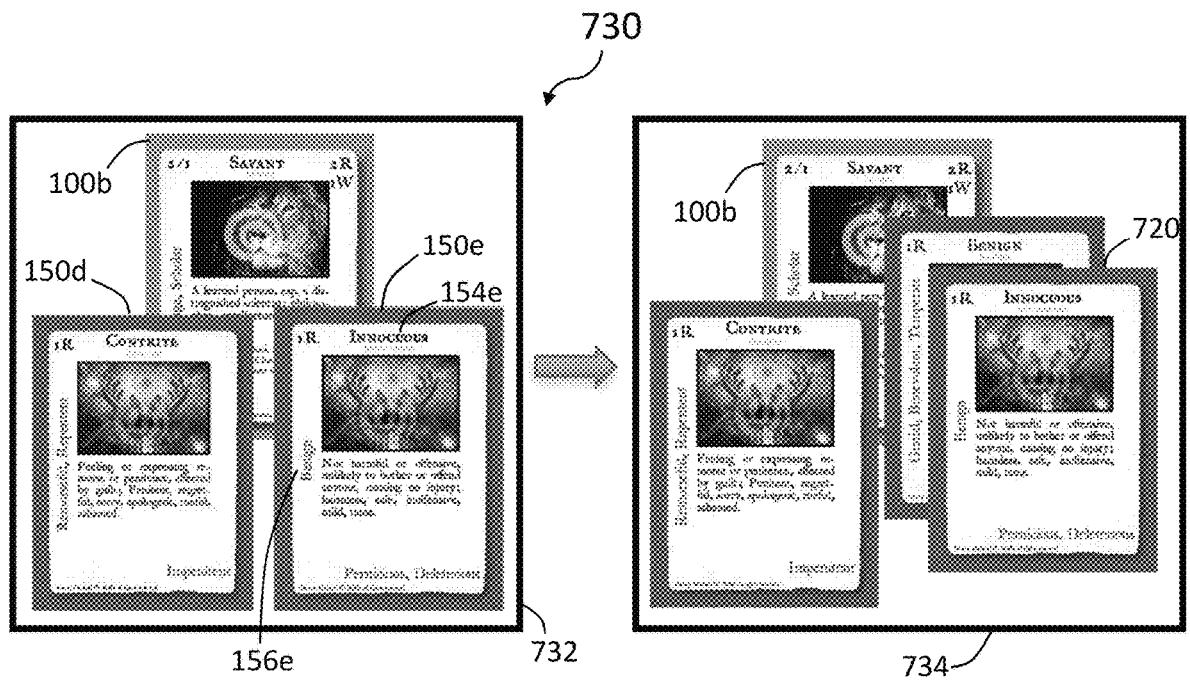

Referring now to FIG. 9, there is shown exemplary game play 730 creating a resource chain 720 supplying the 'Savant' character card 100b. Initially, in frame one 732, the 'Savant' character card 100b commands two nonsynonymous resource cards, 'Contrite' 150d and 'Innocuous' 150e, in compliance with the character command rule that limits character cards to the command of up to, but not more than, two unique resource cards. However, by chaining the 'Benign' resource card 150f to the 'Innocuous' resource card 150e in frame two 734, the 'Savant' character card 100b can be supplied with more than two resource cards 150d-e, without breaking the character command rule. The 'Innocuous' and 'Benign' resource cards 150d-e can be chained because "Benign" is listed on the 'Innocuous' resource card 150e as a synonym 156e of or similar word for the 'Innocuous' character name 154e.

Figure 10:
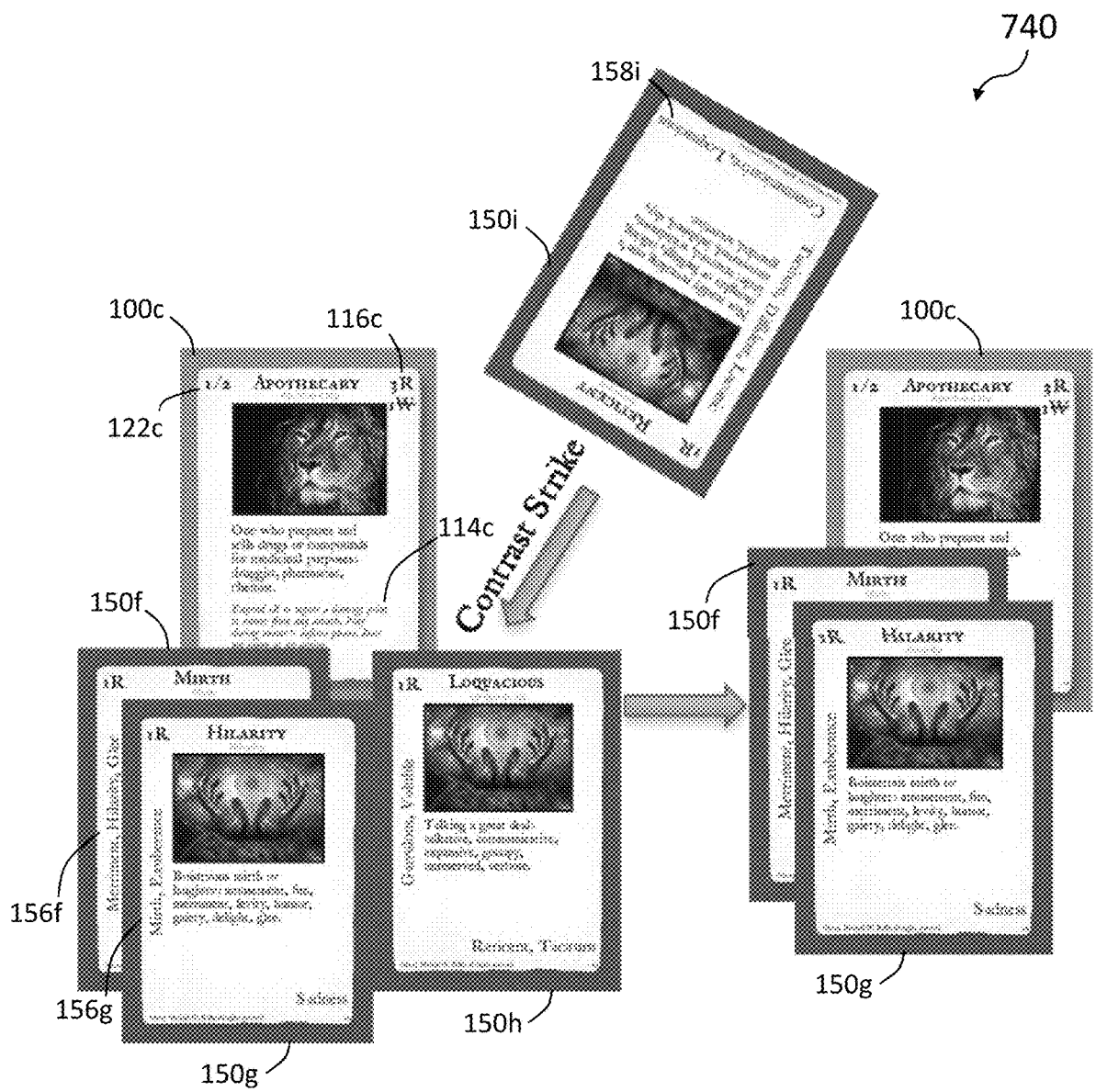
FIG. 10 shows an exemplary contrast strike and damage block as disclosed herein and in accordance with various embodiments.

Referring now to FIG. 10, there is shown an illustrative contrast strike and damage block 740. The 'Apothecary' character card 100c is in-play, and requires three (3) resource 116c for supply. The 'Apothecary' character card 100c is adequately supplied by the 'Mirth', 'Hilarity', and 'Loquacious' resource cards 150f-h. This resource supply complies with the character command rule because the 'Hilarity' resource card 150f is chained to the 'Mirth' resource card 150g. The resource chain of the 'Mirth' and 'Hilarity' resource cards 150f-g is allowed because the 'Mirth' resource card 150f lists "Hilarity" as a synonym 156f or, alternatively, because the 'Hilarity' resource card 150g lists "Mirth" as a synonym 156g. Therefore, the 'Apothecary' character card 100c is adequately supplied and capable of defending against attacks with a defense value 122c of one. During a player's action phase, a contrast strike is performed with the 'Reticent' resource card 150i. The 'Reticent' resource card 150i is capable of performing a contrast strike against the 'Loquacious' resource card 150h because the 'Reticent' resource card 150i lists "Loquacious" as an antonym or contrasting word 158i. As a result of the contrast strike performed against the 'Loquacious' resource card 150h, the 'Loquacious' resource card 150h is discarded to the discard pile 712. As an additional result, the 'Apothecary' character card 100c is out of supply and cannot attack, defend, play its special ability 114c, or make a free move. As a further result of the contrast strike, the 'Reticent' resource card 150i is placed in the resource area 708 of the player that performed the contrast strike. Thus, the 'Reticent' resource card 150i is immediately available to supply a character card in-play for that player. In the illustrative embodiment of a contrast strike, the 'Reticent' resource card 150i can only be played directly from the player's hand 704. This contrast strike 740 demonstrates that a character card 100 can come into and out of supply depending upon whether the character card is supplied by the necessary resources. Additionally, this is an example of a damage block. In an alternative embodiment, the 'Reticent' resource card 150 can also be played from the player's resource area 708

In a further embodiment, a character card with the specified special ability can use any resources available in the player's resource area 708 to perform a damage block. In this embodiment, when a character card uses resources from the resource area 708 it does not count as an action. Thus, damage blocks can be performed repeatedly during various opponent player's action phases.

Figure 11:
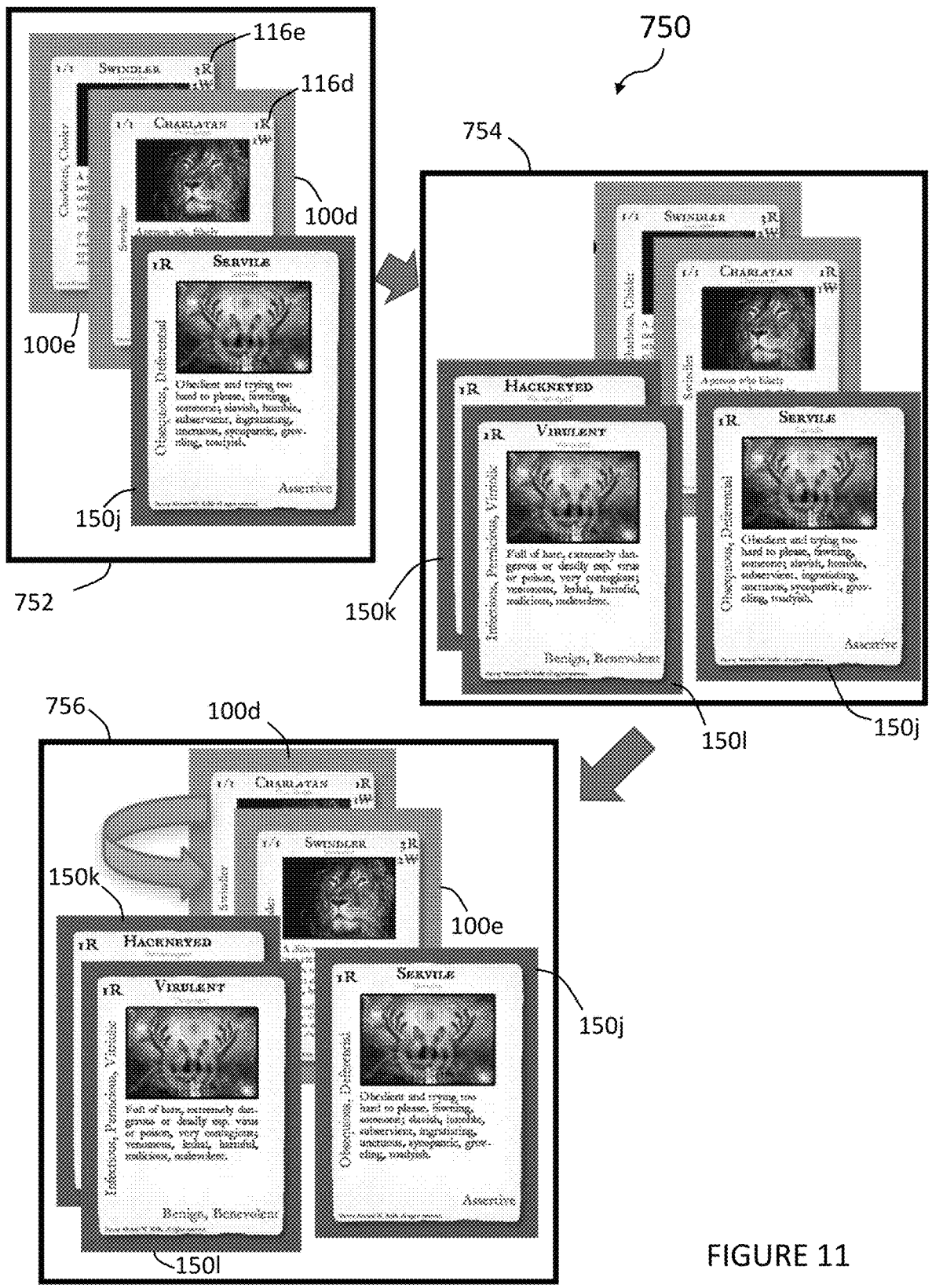
FIG. 11 shows an exemplary character card chain, the creation of a resource chain commanded by the character card chain, and a free move of the character cards as disclosed herein and in accordance with various embodiments.

Referring now to FIG. 11, there is shown illustrative game play 750 including a character chain at frame 752, a resource chain at frame 754, and a free move at frame 756. At frame 752, the 'Charlatan' character card 100d is supplied the one (1) resource 116d required by the 'Servile' resource card 150j and the 'Swindler' character card 100e is chained to the 'Charlatan' character card 100d. The 'Swindler' character card 100e requires three (3) resources 116e to be in supply, but is considered in supply because the 'Charlatan' character card 100d is on top of the character chain and adequately supplied by the 'Servile' resource card 150j. In one embodiment, the top card in a character chain has an increased attack value and defense value equal to the summation of all attack values and defense values of the character cards in the character chain. In the illustrative embodiment, the 'Charlatan' character card 100d is atop the character chain and has an improved attack value of two (2) and an improved defense value of two (2). The 'Charlatan' character card's 100d special ability can be played, but the 'Swindler' character card's 100e special ability is not playable because the 'Swindler' character card 100e is on the bottom of the character chain and not on the top of the character chain.

At frame 754, the 'Virulent' and 'Hackneyed' resource cards 150 are chained during a resource phase and supplying the 'Charlatan' and 'Swindler' character cards 100d-e. At frame 756, during a free move phase the 'Swindler' character card 100e is free moved to the top of the character chain and the 'Charlatan' character card 100d is moved lower in the character chain to the bottom of the character chain. The 'Swindler' character card 100e is now in supply because the 'Hackneyed', 'Virulent', and 'Servile' resource cards were supplying the 'Charlatan' character card 100d and now supply the "Swindler" card.

In a further embodiment, two-character cards that are in play and supplied by one or more resource cards can be chained, but the resulting character chain must comply with the character command rule. Thus, any extra resource cards that were supplying the separate character cards are returned to that player's resource area 708.

If a player wrongly declares a contrast strike, for example, attempts to perform a contrast strike with a resource card that is not an antonym of any of an opponent player's resource cards in-play, the player loses the resource card. Such lost resource cards are placed in the discard and used card pile. Additionally, a wrongly declared contrast strike forfeits the remainder of the player's action phase, for example, the player's action phase immediately terminates.

In a further embodiment, the educational card game disclosed herein can incorporate one or more languages and therefore serve as a foreign language educational tool as well as a vocabulary improvement tool. In one embodiment, the card name is in English and all other terms and explanations are in another language, such as German, Italian, Spanish, French, Japanese, Cantonese, Korean, Russian, etc. However, this division of languages is not limiting and in various embodiments only one item on the card is in another language, half the items on the card are in another language, and any other combination of card items and languages. Wherein the languages on the cards do not share an alphabet, phonetic pronunciations are included for the second language items.

In a further embodiment, cards and players can be represented by game pieces or figures that correspond to the unique traits and qualities of each card or the picture art of the card.

In an alternative embodiment, through the use of special action cards 130 the character command rule limits each character card to the command of one (1) unique resource card. In a further embodiment, through the use of special action cards 130 the character command rule allows each character card to command up to three (3) unique resource cards. In a still further embodiment, the character command rule can limit each character card to the command of one (1) unique resource card or to three (3) unique resource cards.

Figure 12:
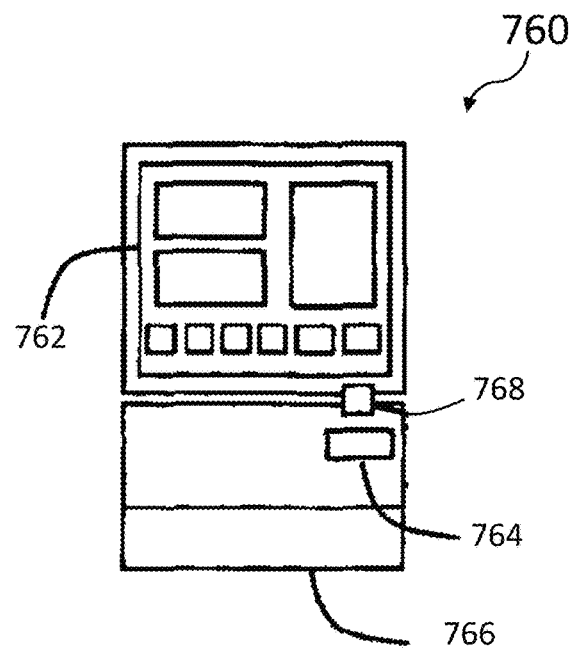
FIG. 12 shows an illustrative stand-alone electronic device configured to operate educational card game embodiments presented herein.

In a further embodiment, a transitory or nontransitory computer readable storage media storing computer-executable program instructions which, when executed by a computer processor, cause the computer to initiate a game session of the education card game. With reference now to FIG. 12, there is shown an illustrative embodiment wherein the transitory or nontransitory computer readable media and program instructions can be included within and executed by a stand-alone electronic device 760. In the illustrative embodiment, the stand-alone electronic device 760 has a touch screen video display 762 that displays a player interface. Other electronic devices that could be used to provide an interactive gaming experience include a computer having interactive gaming software, a personal digital assistant, a mobile phone, a smartphone, or any other such device or combination of devices that displays the interactive game.

Additionally, the illustrative stand-alone device 760 includes a monetary input component that is configured to receive money or transferable credits, respectively. The illustrative monetary input component 764 is a device configured to receive Ticket In Ticket Out (TITO) tickets, coupons, cash, a credit card, debit card or other such instruments that can transfer money or credits. Additionally, the illustrative monetary input component 764 may also be configured to receive transferable credits from an e-wallet on a smartphone. The transferable credits may be provided by a coupon based system.

A communications module 766 included in the stand-alone electronic device 760 includes various communication channels that can utilize Ethernet, I2C, RS-232, USB, RS-485, IEEE 1394, Netplex and other standard or proprietary communication interfaces commonly used in the industry. These communication channels may operate or interface with wired and wireless communications channels. The communications module 766 may be used to communicate with personal communication devices such as smartphones that operate using Bluetooth wireless technology, Wi-Fi or other such technologies that enable communications between the stand-alone electronic device 760 and the personal communication device.

Additionally, the illustrative stand-alone electronic device 760 may also include other input and output devices 768 such as input buttons, bill validators, card readers, printers, displays, audio devices, or lighting devices that are used to provide the entertaining and educational game on the stand-alone machine 760. The input and output device 768 can also be related to distributing awards and include a paper coupon, a smart card, a magnetic stripe card, or any other such means that can record the transfer of money or credits from and/or to the player.

Figure 13:
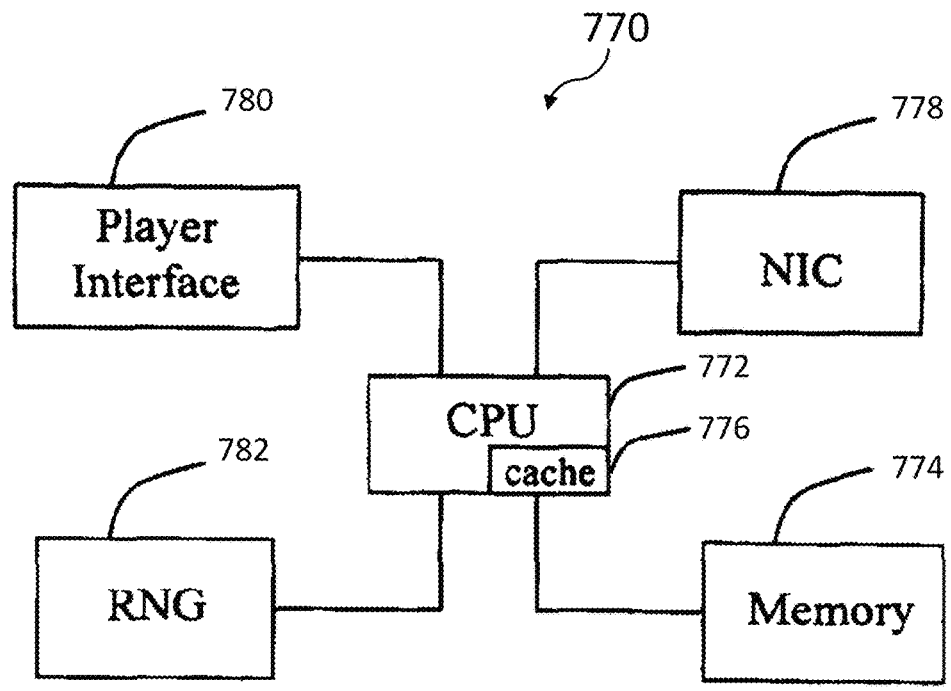
FIG. 13 shows an illustrative block diagram of the system components of the stand-alone electronic device in FIG. 12.

Referring now to FIG. 13 there is shown a simplified illustrative block diagram of the illustrative system components 770 of the stand alone electronic device 760. The system components 770 include a logic component that is operatively coupled to internal components that manage the various game systems and operations for the interactive stand-alone device 760. In one illustrative embodiment, the stand-alone electronic device 760 can include a computer, in which the logic component includes a central processing unit (CPU) 772 and a memory 774 that stores the gaming operations and processes of the interactive educational game. A fast memory cache 776 can also be employed by the CPU 772 to more efficiently access data or software stored in the memory 774. It shall be appreciated by those skilled in the art that the memory cache is a memory that is resident on the CPU 772. Additionally, it shall be appreciated by those skilled in the art that logic component does not have to be a CPU and may include a plurality of logic gates and switches that are either programmed, e.g. a field programmable gate array, or may be an application specific integrated circuit (ASIC).

In the illustrative embodiment, the processor 772 is configured to perform the card randomization, dealing, damage tracking, action tracking, score keeping, and other game operations. Additionally, the stand-alone device 760 typically includes a network interface card 778 that is communicatively coupled to a network so the stand-alone device 760 is configured to communicate with a network as presented below in FIG. 14.

Additionally, in the illustrative embodiment a player interface 780 is operatively coupled to the CPU 772. By way of example and not of limitation, the player interface 780 can include a touch screen video display 762. Alternatively, the player interface 780 may also include a video display (not shown) having a plurality of switches (not shown) that permit the player to interact with the stand-alone device 760. Another alternative player interface 780 is a computer monitor (not shown) having a keyboard or mouse (not shown). Preferably, the player interface includes a monetary input component as described above. Thus, the player interface 780 includes any interface that permits the player to interact with the stand-alone system, input desired game parameters, and play the educational card game.

In an illustrative embodiment, a random number generator 782 is a software module used in the selection of at least one electronic card from a deck or other grouping of cards during a game event. The game event can be a player input for any one or more of an action phase, defense phase, resource phase, free move phase, discard phase, and draw phase. A game session is comprised of a plurality of game events. In the illustrative embodiment, the random selection of an electronic card involves generating a random number and using the random number as a basis for picking at least one card from within the set or deck of cards. It shall be appreciated by those skilled in the art that the random number generator is typically a software program that is stored in the memory 774 and processed by CPU 772.

Alternatively, the picking of at least one electronic card from the set or deck of cards can be simulated using systems and methods that provide the appearance of a random selection. By way of example and not of limitation, the appearance of random selection can be created using well known "lottery" based systems and methods.

In another embodiment, the stand-alone electronic device 760 can include a network interface card (NIC) 778 that permits the stand-alone electronic device 760 to communicate with a plurality of other devices configured to play the interactive game. The NIC 778 can also use well known networking protocols to communicate with other networked devices. These well-known protocols include Ethernet type protocol, TCP/IP protocols or other such network protocols.

Figure 14:
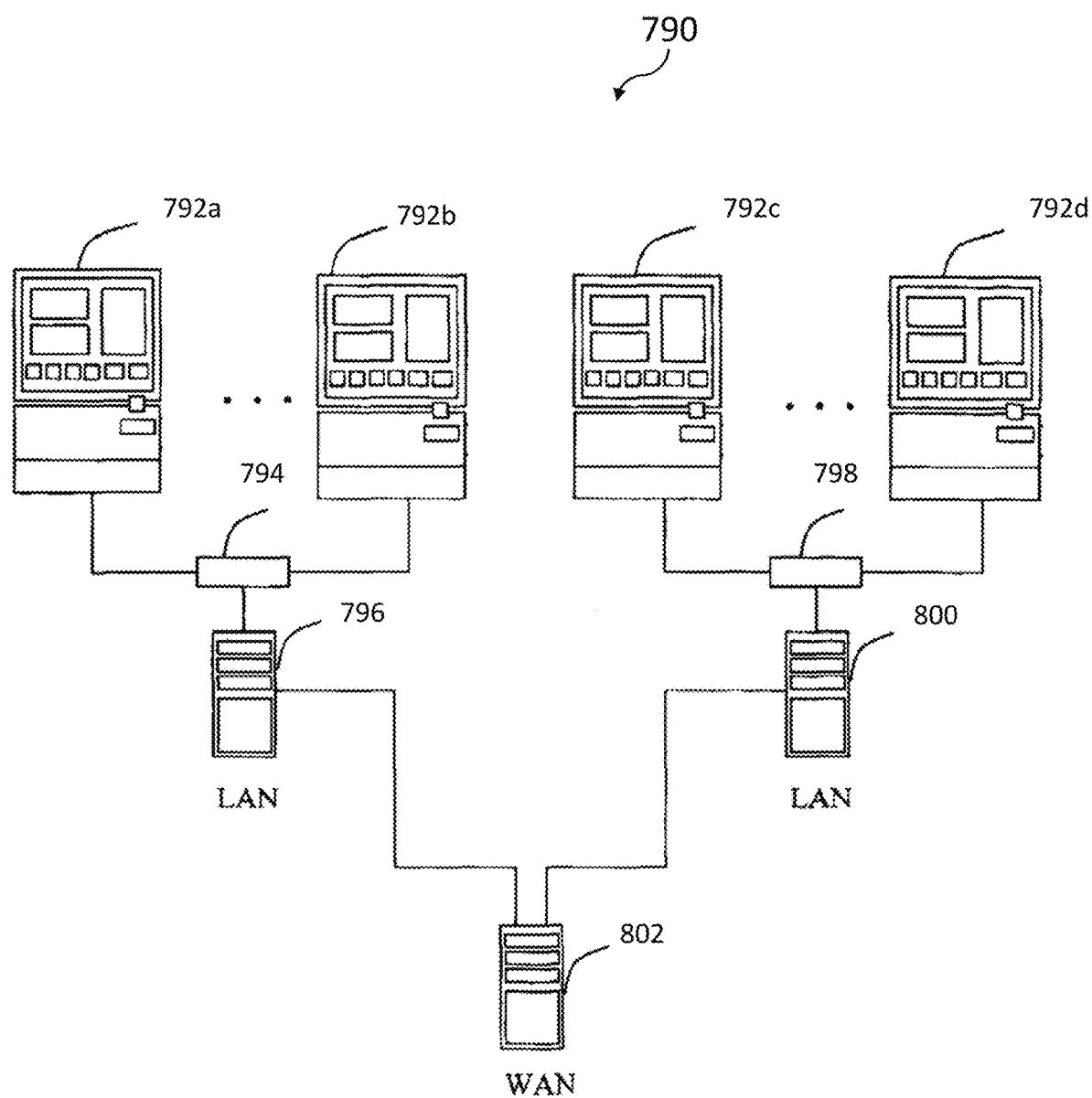
FIG. 14 shows an illustrative network system having a plurality of networked stand-alone devices.

Referring now to FIG. 14 there is shown an illustrative network system 790 having a plurality of networked devices 792*a* through 792*d*. In one illustrative embodiment, the networked devices 792*a* through 792*d* are similar to the stand-alone device 760. In the illustrative network system 790, the networked devices 792*a* and 792*b* are operatively coupled to a node 794 that communicates with a local area network (LAN) server 796. Additionally, the networked devices 792*c* and 792*d* are also operatively coupled to a node 798 that is communication with a LAN server 800. The nodes 794 and 798 may be a hub, router, bridge, gateway or any combination thereof that allows communications between the networked devices. It shall be appreciated by those skilled in the art that each LAN may operate independently of the other.

A wide area network (WAN) is created by linking the LANs together. For illustrative purposes only, both LANs communicate with a WAN server 802. For purposes of this patent, it can be appreciated that the distinction between a LAN and WAN is primarily geographic in nature. The LAN is geographically limited to a bank of illustrative stand-alone electronic devices that can be resident in a hotel, arcade, or other game-oriented facility. A WAN permits banks of networked devices from different buildings, floors, and locations to be networked. There exist several purposes for networking the stand-alone devices, such as accounting, diagnostics, player tracking and loyalty programs.

An alternative embodiment to the illustrative network system 790 comprises having the game logic for the interactive game resident on a central server. The central server can be either the LAN server 796 or WAN server 802. During game play, the server then communicates game outputs to the appropriate client, i.e. one of the networked devices 792*a* through 792*d*. In yet another illustrative embodiment, the central server picks the randomly selected cards and submits the randomly selected cards to each of the devices on the network.

As described above, the educational multiplayer card game method and system described above may be embodied in "Scholar & Sage" card game, which includes four categories of cards: character cards, action cards, resource cards, and wealth cards. A player can chain cards together that have matching synonym or similar attributes. The chaining aspect enforces learning and requires a player to understand synonyms to make tactical an strategic decisions that affect game play.

It is to be understood that the detailed description of illustrative embodiments are provided for illustrative purposes. Thus, the degree of software modularity for the system and method presented above may evolve to benefit from the improved performance and lower cost of the future hardware components that meet the system and method requirements presented. The scope of the claims is not limited to these specific embodiments or examples. Therefore, various limitations, elements, details, and uses can differ from those just described, or be expanded on or implemented using technologies not yet commercially viable, and yet still be within the inventive concepts of the present disclosure. The scope of the subject matter is determined by the following claims and their legal equivalents.

What is claimed is:

1. A method of playing education card games involving two or more players, the method comprising:
   initiating a game session;
   obtaining a group of cards, each card including a card name, a card type, a synonym attribute, and an antonym attribute,
      wherein each card name is selected from a plurality of vocabulary words;
      wherein the card type includes character and resource;
      wherein each synonym attribute includes one or more vocabulary words that are synonymous to the card name;
      wherein each antonym attribute includes one or more vocabulary words that are antonymous to the card name;
   receiving, by each player, an initial hand of at least three cards, wherein the cards are randomly selected from the group of cards;
   entering into play a character card having a required supply value, a first resource card having a first supply value, and a second resource card having a second supply value from a first player's hand;
   supplying the required supply value of the first character card with the first resource card;
   chaining together at least the first resource card and the second resource card according to of the first resource card synonym attribute and the second resource card synonym attribute, wherein the first resource card synonym attribute is similar to the second resource card synonym attribute;
   entering into play a third card from a second player's hand;
   performing, by the third card, a contrast strike on one of the first resource card and the second resource card according to the antonym attribute of one of the first resource card and the second resource card, wherein the third card synonym attribute contrasts the synonym attribute of the first resource card and the second resource card, wherein the third card antonym attribute is similar to the synonym attribute of one of the first resource card and the second resource card; and
   terminating the game session when a triggering event occurs.

2. The method of claim 1 further including:
   discarding, by the first player, at least one card from the first player's hand; and
   distributing, to the first player, at least one card from the group of cards.

3. The method of claim 1 wherein card type further includes action and wealth.

4. The method of claim 3 wherein each card further includes an ability attribute.

5. The method of claim 1 wherein the cards are physical cards.

6. The method of claim 1 wherein the cards are digital cards.

7. A non-transitory computer-readable medium storing instructions that, if executed by a computing system having a processor, cause the computing system to initiate a game session involving two or more players comprising a plurality of game events, the game events including:
- obtaining a group of cards, each card including a card name, a card type, a synonym attribute, and an antonym attribute,
  - wherein each card name is selected from a plurality of vocabulary words;
  - wherein the card type includes character and resource;
  - wherein each synonym attribute includes one or more vocabulary words that are synonymous to the card name;
  - wherein each antonym attribute includes one or more vocabulary words that are antonymous to the card name;
- providing each player with an initial hand of a predetermined number of cards wherein the cards are randomly selected from the group of cards;
- entering into play a character card having a required supply value, a first resource card having a first supply value, and a second resource card having a second supply value from a first player's hand;
- supplying the required supply value of the first character card with the first resource card;
- chaining together at least played by the first player resource card and the second resource card according to the first resource card synonym attribute and the second resource card synonym attribute, wherein the first resource card synonym attribute is similar to the second resource card synonym attribute; and
- terminating the game session when a triggering event occurs.

8. The non-transitory computer-readable medium storing instructions of claim 7 further including performing, by a card played by a second player, a contrast strike on one of the first resource card and the second resource card played by the first player according to one of the first resource card antonym attribute and the second resource card antonym attribute, wherein a synonym attribute of the card played by the second player contrasts one of the first resource card synonym attribute and the second resource card synonym attribute, and wherein the antonym attribute of the card played by the second player is similar to one of the first resource card synonym attribute and the second resource card synonym attribute.

9. The non-transitory computer-readable medium storing instructions of claim 7 wherein card type further includes action and wealth.

10. The non-transitory computer-readable medium storing instructions of claim 9 wherein each card further includes an ability attribute.

11. The non-transitory computer-readable medium storing instructions of claim 7 further including:
- discarding, by the first player, at least one card from the first player's hand; and
- distributing, to the first player, at least one card from the group of cards.

12. The non-transitory computer-readable medium storing instructions of claim 7 wherein the cards are digital cards.

13. A system of playing educational card games involving two or more players, the system comprising:
- at least two players;
- a deck of educational cards, wherein each card includes a card name, a card type, a synonym attribute, and an antonym attribute;
- wherein each card name is selected from a plurality of vocabulary words;
- wherein the card type includes character and resource;
- wherein each synonym attribute includes one or more vocabulary words that are synonymous to the card name;
- wherein each antonym attribute includes one or more vocabulary words that are antonymous are randomly selected from the group of cards;
- a game session including a plurality of game events;
- an initial hand of at least three cards for each player, wherein each hand of cards is randomly selected from the deck of cards;
- a first game event wherein a first player enters into play a character card having a required supply value, a first resource card having a first supply value, and a second resource card having a second supply value from the first player's hand;
- the first game event further includes chaining the first resource card and the second resource card together according to the first resource card synonym attribute and the second resource card synonym attribute, wherein the first resource card synonym attribute is similar to the second resource card synonym attribute;
- a second game event wherein a second player performs a contrast strike on one of the first resource card and the second resource card with a card from the second player's hand, wherein the card synonym attribute contrasts one of the first resource card synonym attribute and the second resource card synonym attribute, wherein the card synonym attribute is similar to one of the first resource card antonym attribute and the second resource card antonym attribute; and
- a triggering event terminating the game session.

14. The system of claim 13 wherein card type further includes action and wealth.

15. The system of claim 13 wherein each card further includes an ability attribute.

16. The system of claim 13 wherein the cards are physical cards.

17. The system of claim 13 wherein the cards are digital cards.

18. The method of claim 1 wherein each card further includes a picture unique to the card name.

19. The non-transitory computer-readable medium storing instructions of claim 13 wherein each card includes a picture unique to the card name.

20. The system of claim 13 wherein each card includes a picture unique to the card name.

* * * * *